(12) United States Patent
Hutchings et al.

(10) Patent No.: US 11,792,560 B2
(45) Date of Patent: Oct. 17, 2023

(54) AUDIO OPERATING SYSTEMS FOR PORTABLE ELECTRONIC ACCESSORY SYSTEMS AND RELATED SYSTEMS, METHODS, AND DEVICES

(71) Applicant: Skullcandy, Inc., Park City, UT (US)

(72) Inventors: Jeff Hutchings, Lehi, UT (US); Jason Hodell, Park City, UT (US); Nikolaj Hviid, Stockdorf (DE)

(73) Assignee: Skullcandy, Inc., Park City, UT (US)

( * ) Notice: Subject to any disclaimer, the term of this patent is extended or adjusted under 35 U.S.C. 154(b) by 0 days.

(21) Appl. No.: 17/303,155

(22) Filed: May 21, 2021

(65) Prior Publication Data
US 2022/0377448 A1 Nov. 24, 2022

(51) Int. Cl.
| | |
|---|---|
| *H04R 5/02* | (2006.01) |
| *H04R 1/10* | (2006.01) |
| *G06F 3/16* | (2006.01) |
| *H04R 1/08* | (2006.01) |
| *H04R 5/033* | (2006.01) |
| *H04R 5/04* | (2006.01) |

(Continued)

(52) U.S. Cl.
CPC .......... *H04R 1/1041* (2013.01); *G06F 3/165* (2013.01); *H04R 1/08* (2013.01); *H04R 1/1025* (2013.01); *H04R 5/033* (2013.01); *H04R 5/04* (2013.01); *H04L 67/10* (2013.01); *H04R 2420/07* (2013.01); *H04W 4/30* (2018.02)

(58) Field of Classification Search
CPC ...... H04R 1/1041; H04R 1/08; H04R 1/1025; H04R 5/033; H04R 5/04; H04R 2420/07; G06F 3/165; H04W 4/30; H04L 67/10

USPC ......................................................... 381/309
See application file for complete search history.

(56) References Cited

U.S. PATENT DOCUMENTS 10,798,210 B2 * 10/2020 Matus ................... H04L 67/306
10,826,862 B1 * 11/2020 Suprasadachandran Pillai ...........
H04L 51/224

(Continued)

FOREIGN PATENT DOCUMENTS

DE 202006017795 U1 4/2007

OTHER PUBLICATIONS

European Extended Search Report and Opinion for European Application No. 22174173.9, dated Oct. 17, 2022, 7 pages.
English Translation of CN 111031433 (Year: 2020).

*Primary Examiner* — Ammar T Hamid
(74) *Attorney, Agent, or Firm* — TraskBritt

(57) ABSTRACT

Audio operating systems and related systems, methods, and devices are disclosed. A portable electronic accessory includes a microphone to receive audio inputs, a speaker to provide audio outputs, and control circuitry including a cellular data radio circuit and an application processor. The cellular data radio circuit is configured to communicate with a cloud server through a cellular data network. The application processor is configured to execute at least a portion of an audio operating system. The audio operating system is configured to host audio software applications provided by the cloud server. The audio software applications are configured to operate free from graphical user interface elements based at least in part on the audio inputs and the audio outputs. The cloud server includes one or more data storage devices including software application code for audio software applications to be hosted by an audio operating system (OS) of the portable electronic accessory.

20 Claims, 6 Drawing Sheets

(51) Int. Cl.
   *H04W 4/30*     (2018.01)
   *H04L 67/10*    (2022.01)

(56) References Cited

U.S. PATENT DOCUMENTS

| | | |
|---|---|---|
| 2014/0122720 A1* | 5/2014 | Jung .................. H04L 41/5054 |
| | | 709/225 |
| 2014/0161301 A1 | 6/2014 | Merenda |
| 2015/0110315 A1 | 4/2015 | Callias et al. |
| 2017/0064433 A1 | 3/2017 | Hirsch et al. |
| 2019/0007540 A1* | 1/2019 | Shaik .................. H04M 1/6066 |
| 2019/0207777 A1* | 7/2019 | Patel ....................... H04L 12/12 |
| 2020/0104194 A1 | 4/2020 | Chalmers et al. |
| 2020/0142667 A1* | 5/2020 | Querze ................... G06F 3/165 |
| 2020/0401539 A1 | 12/2020 | Kim |
| 2021/0074309 A1* | 3/2021 | Dusan ..................... G10L 15/08 |
| 2021/0124772 A1* | 4/2021 | Jorgensen ........... G06F 16/4387 |
| 2021/0255710 A1* | 8/2021 | Fleizach ................. G06F 3/016 |
| 2021/0329424 A1* | 10/2021 | Barzuza ............ H04M 1/72451 |

\* cited by examiner

AUDIO OPERATING SYSTEMS FOR PORTABLE ELECTRONIC ACCESSORY SYSTEMS AND RELATED SYSTEMS, METHODS, AND DEVICES

TECHNICAL FIELD

This disclosure relates generally to audio operating systems, and more specifically to audio operating systems for portable electronic accessory systems such as truly wireless stereo (TWS) headphone systems.

BACKGROUND

Truly wireless stereo (TWS) headphones have become a popular alternative to conventional wired headphones. TWS headphones allow the user to listen to music and podcasts, participate in two-way voice and video communications, and hear audio for videos without the inconveniences associated with wired headphones. TWS headphones are commonly sold with a TWS headphone case that is used to charge and store the TWS headphones.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
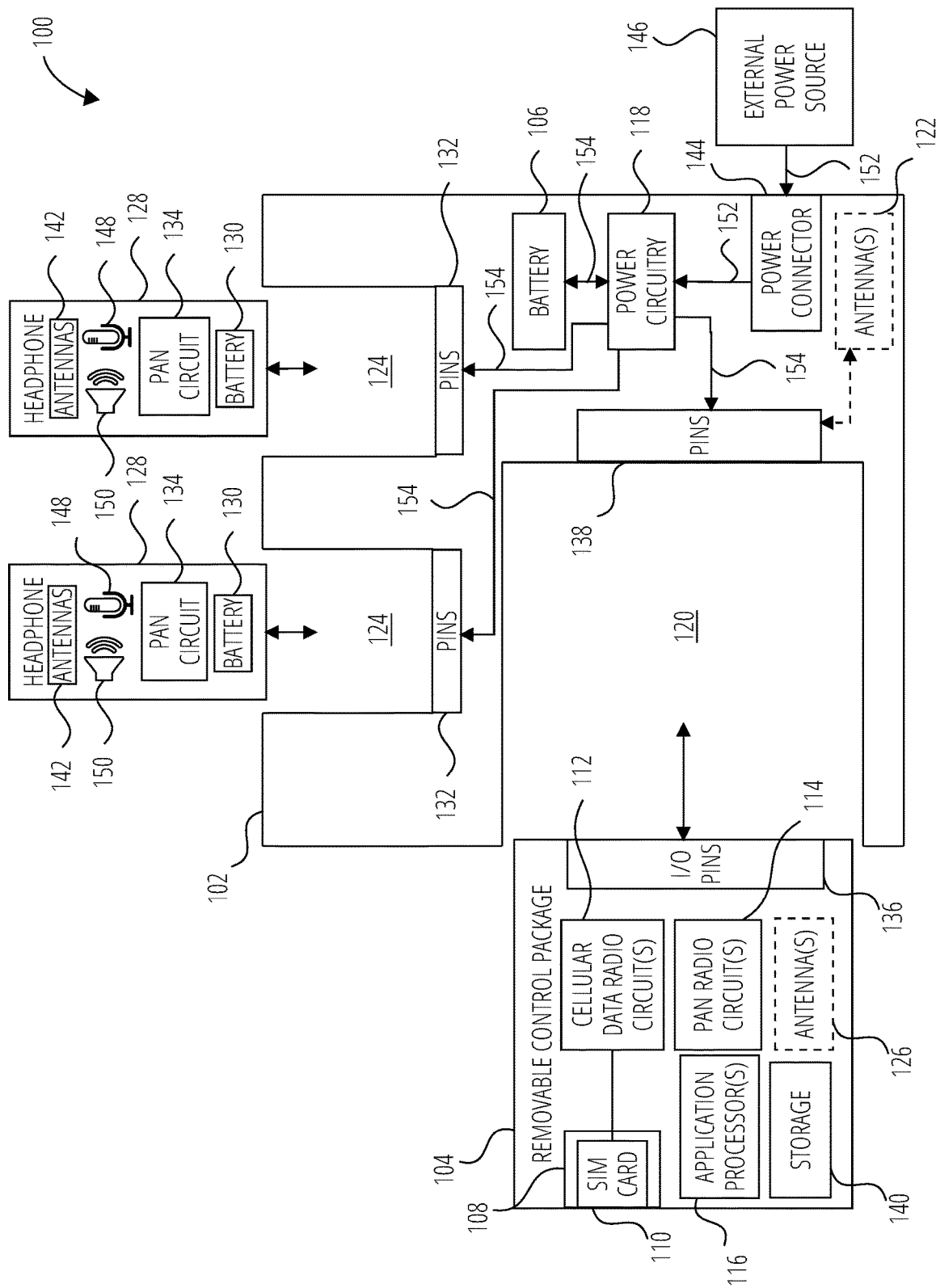
FIG. 1 is a block diagram of a portable electronic accessory system, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

In some embodiments, disclosed herein are truly wireless earbuds outfitted with firmware and hardware to connect and interact with cloud applications and cloud services. For example, embodiments disclosed herein may be used during outdoor activities (e.g., "on the go") to create engagement upstream and downstream. Also, embodiments disclosed herein may be used for community communications and services.

In some embodiments, disclosed herein are hands-free voice-assisted TWS platforms. Through communications (e.g., cellular data communications) with cloud-enabled audio software applications, a truly hands-free voice-command driven experience may enable teams of users to connect with each other (e.g., on the go). Embodiments disclosed herein may be useful to provide active team experiences not previously known in the art.

Embodiments disclosed herein may include a communication connection between a portable electronic accessory and one or more cloud servers. The communication connection may be formed using a direct cellular modem technology embedded in an earphone (e.g., a charging case of TWS headphones). As a result, a user may not need to carry a separate mobile telephone device to provide a communication connection to the one or more cloud servers. By way of non-limiting examples, the communication connection between the portable electronic accessory and the one or more cloud servers using fourth generation (4G) wireless communication protocols (e.g., long term evolution (LTE) protocols), fifth generation (5G) wireless communication protocols, other technologies, or combinations thereof.

Embodiments disclosed herein may include, in addition to a cellular data radio circuit, an embedded application processor platform capable of running an audio operating system and a suite of audio software applications and/or services from a dedicated cloud-based audio software application store. The audio software application store may enable monetization, enablement, and disablement of the audio software applications remotely (e.g., at the portable electronic accessory) through a direct audio interface independent of a screen-based interface (e.g., independent of a graphical user interface displayed on an electronic display). For example, a user of a portable electronic accessory may receive audio notifications of new services he or she may be interested in, and verbally opt-in to the services by speaking to the earphone rather than interacting with a screen. The user may also make verbal requests such as "what's new" and receive audio prompts describing services and audio software applications deemed interesting or relevant to the particular user.

In some embodiments a portable electronic accessory includes one or more microphones configured to receive audio inputs, one or more speakers configured to provide audio outputs, and control circuitry operably coupled to the one or more speakers and the one or more microphones. The control circuitry includes one or more cellular data radio circuits configured to communicate with one or more cloud servers through a cellular data network. The control circuitry also includes one or more application processors configured to execute at least a portion of an audio operating system. The audio operating system is configured to host audio software applications provided by the one or more cloud servers. The audio software applications are configured to operate free from graphical user interface elements based at least in part on the audio inputs and the audio outputs.

In some embodiments one or more cloud servers for supporting a portable electronic accessory include a network interface configured to communicate with the portable electronic accessory, one or more processors operably coupled to the network interface, and one or more data storage devices operably coupled to the one or more processors. The one or more data storage devices include computer-readable instructions stored thereon. The computer-readable instructions include software application code for audio software applications to be hosted by an audio operating system of the portable electronic accessory and operating system support engine code. The audio software applications are configured to operate free from graphical user interface elements based at least in part on audio inputs and audio outputs at the portable electronic accessory. The operating system support engine code, when executed by the one or more processors, is configured to support operation of the audio operating system.

FIG. 1 is a block diagram of a portable electronic accessory system 100, according to some embodiments. The portable electronic accessory system 100 includes a portable electronic accessory 102 and a removable control package 104. The portable electronic accessory 102 includes a battery 106 configured to provide battery power 154 and a control socket 120 configured to receive the removable control package 104. The removable control package 104 is configured to control operation of the portable electronic accessory 102. The portable electronic accessory 102 also includes power circuitry 118 configured to deliver at least a portion of the battery power 154 to the removable control package 104 to power the removable control package 104.

The removable control package 104 also includes a power connector 144 configured to receive external power 152 from an external power source 146 and provide the external power 152 to the power circuitry 118. By way of non-limiting example, the external power source 146 may include an alternating current (AC) to direct current (DC) power converter configured to convert AC power from a plug to the external power 152 in the form of DC power. Also by way of non-limiting example, the external power source 146 may include a wireless power transmitter and the power connector 144 may include a wireless power receiver. The power circuitry 118 provides battery power 154 to the battery 106 responsive to the external power 152. The power circuitry 118 may also control charging of the battery 106 and distribution of the battery power 154 from the battery 106 to the removable control package 104.

In some embodiments the portable electronic accessory 102 is a truly wireless stereo (TWS) headphone case including headphone receptacles 124. The headphone receptacles 124 are configured to receive headphones 128 (e.g., TWS headphones) therein to store the headphones 128 in the TWS headphone case and charge headphone batteries 130 of the headphones 128 while the headphones 128 are received in the headphone receptacles 124. In some embodiments the headphone receptacles 124 include charging pins 132 therein. The charging pins 132 are configured to deliver charging power to the headphones 128 when the headphones 128 are received in the headphone receptacles 124. The power circuitry 118 may be configured to control delivery of the battery power 154 to the charging pins 132. The headphones 128 may store the charging power in the headphone batteries 130. The headphone batteries 130 are configured to power speakers 150 and microphones 148, and circuitry of the headphone 128. Although the portable electronic accessory 102 illustrated in FIG. 1 is a TWS headphone case, the disclosure is not so limited. For example, in some embodiments the portable electronic accessory 102 may be a watch (e.g., a smart watch), electronic glasses, or a speaker assembly (e.g., a wireless speaker).

In some embodiments the control socket 120 has a form factor of a secure digital (SD) card socket and the removable control package 104 has a form factor of an SD card. An SD card form factor may enable easy insertion and removal of the removable control package 104 from the control socket 120. The control socket 120 and the removable control package 104 may take other forms, however. For example, the control socket 120 and the removable control package 104 may instead reflect a CompactFlash form factor, a MultiMediaCard form factor, a Memory Stick form factor, or any other form factor. In some embodiments the control socket 120 is configured to completely house the removable control package 104. In some embodiments the control socket 120 is configured to at least partially house the removable control package 104.

The removable control package 104 includes input/output pins (I/O pins 136) configured to interface with control pins 138 of the control socket 120 of a portable electronic accessory 102. The control socket 120 is configured to removably receive the removable control package 104. The I/O pins 136 are configured to electrically connect to the control pins 138 of the control socket 120 when the removable control package 104 is received into the control socket 120. The I/O pins 136 are configured to receive battery power 154 from the battery 106 of the portable electronic accessory 102.

The removable control package 104 is configured to power circuitry of the removable control package 104 using the battery power 154 received through the I/O pins 136. For example, the removable control package 104 may include one or more communication radio circuits. By way of non-limiting examples, the communication radio circuits may include one or more cellular data radio circuits 112 (e.g., a fourth generation (4G) long-term evolution (LTE) radio circuit, a fifth generation (5G) radio circuit, etc.), and one or more personal area network (PAN) radio circuits 114 (e.g., a BLUETOOTH® radio circuit, a ZIGBEE® radio circuit, etc.). Also by way of non-limiting example, the cellular data radio circuits 112 may include one or more of a narrow-band internet of things (NB-IoT) radio circuit and an enhanced machine type communication (eMTC) long-term evolution (LTE-M) radio circuit.

The one or more communication radio circuits are configured to provide wireless communication capabilities to the portable electronic accessory 102. In embodiments where the cellular data radio circuits 112 include an NB-IoT radio circuit the cellular data radio circuits 112 may be capable of providing voice and data communications. In embodiments where the cellular data radio circuits 112 include an LTE-M radio circuit the cellular data radio circuits 112 may be capable of providing full music streaming capabilities to the cellular data radio circuits 112.

In embodiments where the removable control package 104 includes one or more cellular data radio circuits 112 the removable control package 104 may include a Subscriber Identity Module (SIM) card slot (SIM card slot 108) configured to receive a SIM card 110. The cellular data radio circuits 112 may use the SIM card slot 108 in cellular data operations.

In some embodiments one or more communication radio circuits of the removable control package 104 may be configured to communicate with one or more antennas 122 of the portable electronic accessory 102 through the I/O pins 136 and the control pins 138. In some embodiments the one or more antennas 122 may include a cellular data antenna (not shown) configured to interface with the one or more cellular data radio circuits 112 of the removable control package to enable the cellular data radio circuits 112 to communicate by way of a cellular data network (not shown). By way of non-limiting example, the one or more antennas 122 may include a 4G LTE cellular data antenna. Also by way of non-limiting example, the one or more antennas 122 may include a 5G cellular data antenna. As another non-limiting example, the one or more antennas may include a narrow-band internet of things (NB-IoT) antenna configured to interface with an NB-IoT radio circuit of the cellular data radio circuits 112. The NB-IoT antenna may be configured to enable the NB-IoT radio circuit to communicate by way an NB-IoT network. As a further non-limiting example, the one or more antennas may include an enhanced machine type communication (eMTC) long-term evolution (LTE-M) antenna configured to interface with an LTE-M radio circuit of the cellular data radio circuits 112. The LTE-M radio circuit is configured to enable the LTE-M radio circuit to communicate by way an NB-IoT network. As an even further non-limiting example, the one or more antennas 122 may include a wireless PAN (e.g., BLUETOOTH®, ZIGBEE®, etc.) antenna configured to interface with a wireless PAN radio circuit of the PAN radio circuits 114. The wireless PAN antenna may enable the PAN radio circuits 114 to communicate with one or more PAN peripheral devices (e.g., the headphones 128). By way of non-limiting example, the headphones 128 may include antennas 142 and PAN peripheral circuits 134. The PAN peripheral circuits 134 may be configured to communicate with the PAN radio circuits 114 through the antennas 142 and the one or more antennas 122 or one or more antennas 126 (discussed in more detail below).

In some embodiments the removable control package 104 itself may include one or more antennas 126. The one or more antennas 126 may include any one or more of the one or more antennas 122 discussed above. As a result, in various embodiments all the antennas may be located in the removable control package 104, all of the antennas may be located in the portable electronic accessory 102, or the antennas may be distributed within both the removable control package 104 and the portable electronic accessory 102. Because of limited space on the removable control package 104, however, it may be convenient to provide most or all of the antennas in the one or more antennas 122 of the portable electronic accessory 102.

The removable control package 104 may further include one or more application processors 116 and one or more data storage devices 140 (e.g., serial Flash, pseudostatic dynamic random access memory (PSRAM), etc.). The data storage devices 140 are configured to store computer-readable instructions for an operating system (e.g., an audio operating system) and software applications (e.g., music software applications). The application processors 116 are configured to execute the computer-readable instructions stored by the data storage devices 140. An audio operating system may be used with truly wireless stereo (TWS) headphones 128 responsive to insertion of the removable control package 104 into the control socket 120, the portable electronic accessory comprising a TWS headphone case for the TWS headphones. The application processors 116 may be configured to execute one or more music software applications to provide music to the headphones 128 (e.g., via the PAN radio circuits 114). Although the application processors 116 is shown separately from the cellular data radio circuits 112 and the PAN radio circuits 114, in some embodiments the application processors 116 may be implemented on the cellular data radio circuits 112 or the PAN radio circuits 114. As a specific non-limiting example the application processors 116 may be implemented on one or more PAN radio circuits 114 including a BLUETOOTH® radio circuit such as on an Airoha AB1552A BLUETOOTH® system on chip (SoC). The data storage devices 140 may also be configured to store audio data (e.g., music, podcasts, etc.), which may be provided to the headphones 128 via the PAN radio circuits 114 and the PAN peripheral circuits 134.

In operation, the removable control package 104 may be inserted into the control socket 120. As a result, the removable control package 104 may be powered by battery power 154 delivered to the removable control package 104 (e.g., via the control pins 138 and the I/O pins 136). If the headphones 128 are removed from the headphone receptacle 124 (e.g., worn by a user) the PAN radio circuits 114 of the removable control package 104 may communicate with the PAN peripheral circuits 134 of the headphones 128 (e.g., through the one or more antennas 122 or the one or more antennas 126 and the antennas 142). As a result the application processors 116 may provide and receive audio elements (e.g., audio commands received through the microphones 148, button or touch inputs received through buttons or touch sensors of the headphones 128, etc.) for an audio operating system to and from the headphones 128 via the PAN radio circuits 114, which is in communication with the PAN peripheral circuits 134 of the headphone 128. The cellular data radio circuits 112 may provide an Internet connection (e.g., via the one or more antennas 122 or the one or more antennas 126), which may be utilized by the operating system to provide network resources.

By way of non-limiting example, audio (e.g., music, podcasts, etc.) may be streamed to the speakers 150 of the headphone 128 using a multi-media software application (e.g., a music software application, a podcast software application, etc.) enabled by the application processors 116. The audio may be provided by a content provider through the Internet. The one or more antennas 122 or the one or more antennas 126 may receive the audio from the Internet and provide the audio to the cellular data radio circuits 112. The application processors 116 may control the PAN radio circuits 114 to provide the audio to the PAN peripheral circuits 134 of the headphones 128 (e.g., by providing the audio to the one or more antennas 122, which may provide the audio to the antennas 142 of the headphones 128).

Also by way of non-limiting example, two-way voice communication may be enabled. For example, the microphones 148 may capture voice data corresponding to acoustic waves in proximity to the microphones 148, and provide the voice data to the PAN peripheral circuits 134. The PAN peripheral circuits 134 may transmit the voice data, using the antennas 142, to the one or more antennas 122 or the one or more antennas 126, which may provide the voice data to the PAN radio circuits 114. The cellular data radio circuits 112 may then transmit the voice data over the Internet via the one or more antennas 122 or the one or more antennas 126. The cellular data radio circuits 112 may also receive received voice data transmitted to the cellular data radio circuits 112 via the one or more antennas 122 or the one or more antennas 126 through the Internet. The PAN radio circuits 114 may forward the received voice data to the PAN peripheral circuits 134 via the one or more antennas 122 or the one or more antennas 126, and the PAN peripheral circuit 134 may provide the received voice data to the speakers 150, which may convert the received voice data to acoustic waves. In this way, a user may engage in two-way voice communications using the portable electronic accessory system 100.

As a further non-limiting example, the application processors 116 may provide an audio user interface via the headphones 128. For example, audio messages corresponding to menu options may be stored in the data storage devices 140, and the audio messages may be provided to the headphones 128 for presentation to the user using the speakers 150 via the PAN radio circuits 114 and the PAN peripheral circuits 134. As another example, audio messages corresponding to menu options may be stored remotely by one or more cloud servers. User selections, other verbal commands, and/or button selections of buttons on the headphones 128 and/or on the portable electronic accessory 102 may be received at the application processors 116 (e.g., through the PAN peripheral circuits 134 and the PAN radio circuits 114 or via the control pins 138 and the I/O pins 136).

Software applications that may be stored by the data storage devices 140 and executed by the application processors 116 (or stored and/or executed by one or more cloud servers) may include audio software applications configured to operate free from graphical user interface elements based at least in part on audio inputs and audio outputs of the audio user interface. By way of non-limiting examples, audio software applications may include a community engagement on the go software application, a location intelligence software application, a health and workout intelligence software application, a voice interface software application (e.g., a phone software application), online shopping software applications, search engine software applications, web browser software applications, music streaming software applications, cloud connection software applications, a settings software application, a software application store software application, a music sharing software application, an audio-enabled text message software application, other software applications, or combinations thereof.

It is contemplated herein that the control socket 120 is configured to receive various different removable control packages. For example, when a user is desirous to upgrade functional features of the removable control package 104, the user may simply remove the removable control package 104 and replace the removable control package 104 with a different removable control package having upgraded capabilities. In a similar way a faulty removable control package may be removed from the control socket 120 and replaced with a functional removable control package to enable replacement of the electronics of the removable control package 104 without the need to replace the portable electronic accessory 102. Furthermore, the portable electronic accessory 102 may be replaced without the need to replace the removable control package 104 because the removable control package 104 may be removed from the portable electronic accessory 102 and placed into a new portable electronic accessory. Also, a user may use the removable control package 104 with various different portable electronic accessories. For example, the user may remove the removable control package 104 from the control socket 120 of the portable electronic accessory 102 and insert the removable control package 104 into a different portable electronic accessory (e.g., another TWS headphone case, a smart watch, electronic glasses, etc.). As a result, a single removable control package 104 may be used in conjunction with several different portable electronic devices without the need for expensive control circuitry in each of the portable electronic devices.

Figure 2:
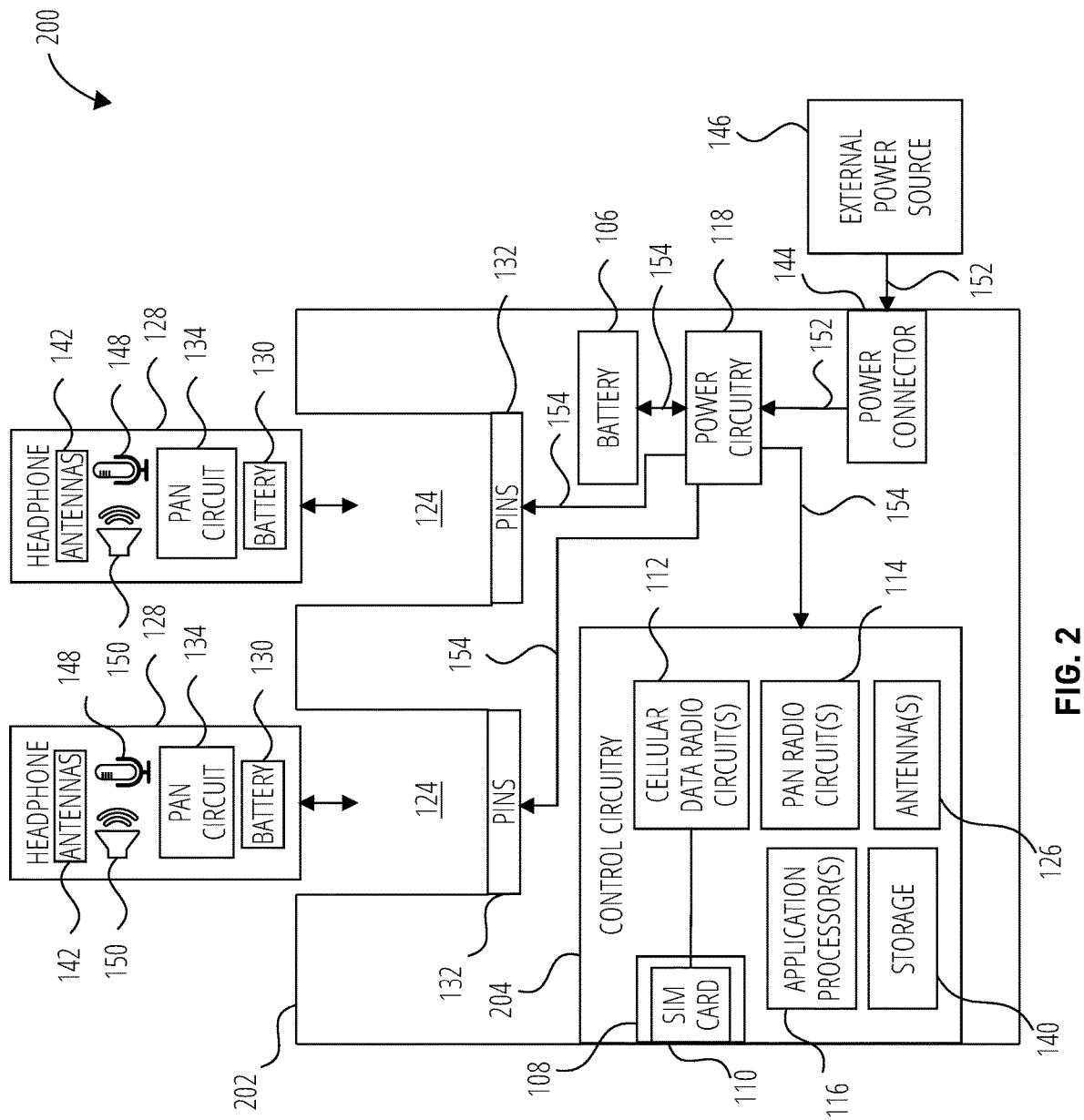
FIG. 2 is a block diagram of another portable electronic accessory system, according to some embodiments.

FIG. 2 is a block diagram of another portable electronic accessory system 100, according to some embodiments. The portable electronic accessory system 200 is similar to the portable electronic accessory system 100 of FIG. 1. For example, the portable electronic accessory system 200 includes the external power source 146 and headphones 128, as discussed with reference to FIG. 1. The portable electronic accessory system 200 also includes a portable electronic accessory 202, which is similar to the portable electronic accessory 102 of FIG. 1 except that instead of the removable control package 104 of the portable electronic accessory 102 of FIG. 1, the portable electronic accessory 202 includes control circuitry 204, which is built into (e.g., not removable from) the portable electronic accessory 202.

Similar to the removable control package 104, the control circuitry 204 includes the SIM card slot 108, the SIM card 110, the cellular data radio circuits 112, the PAN radio circuits 114, the application processors 116, the one or more antennas 126, and the data storage devices 140 discussed above with reference to FIG. 1. The control circuitry 204, however, may not include the I/O pins 136 and the portable electronic accessory 202 may not include the control pins 138 discussed above with reference to FIG. 1. Rather, since the control circuitry 204 is built into the portable electronic accessory 202, the power circuitry 118 may deliver the battery power 154 to the control circuitry 204 without the need for detachable pins.

Figure 3:
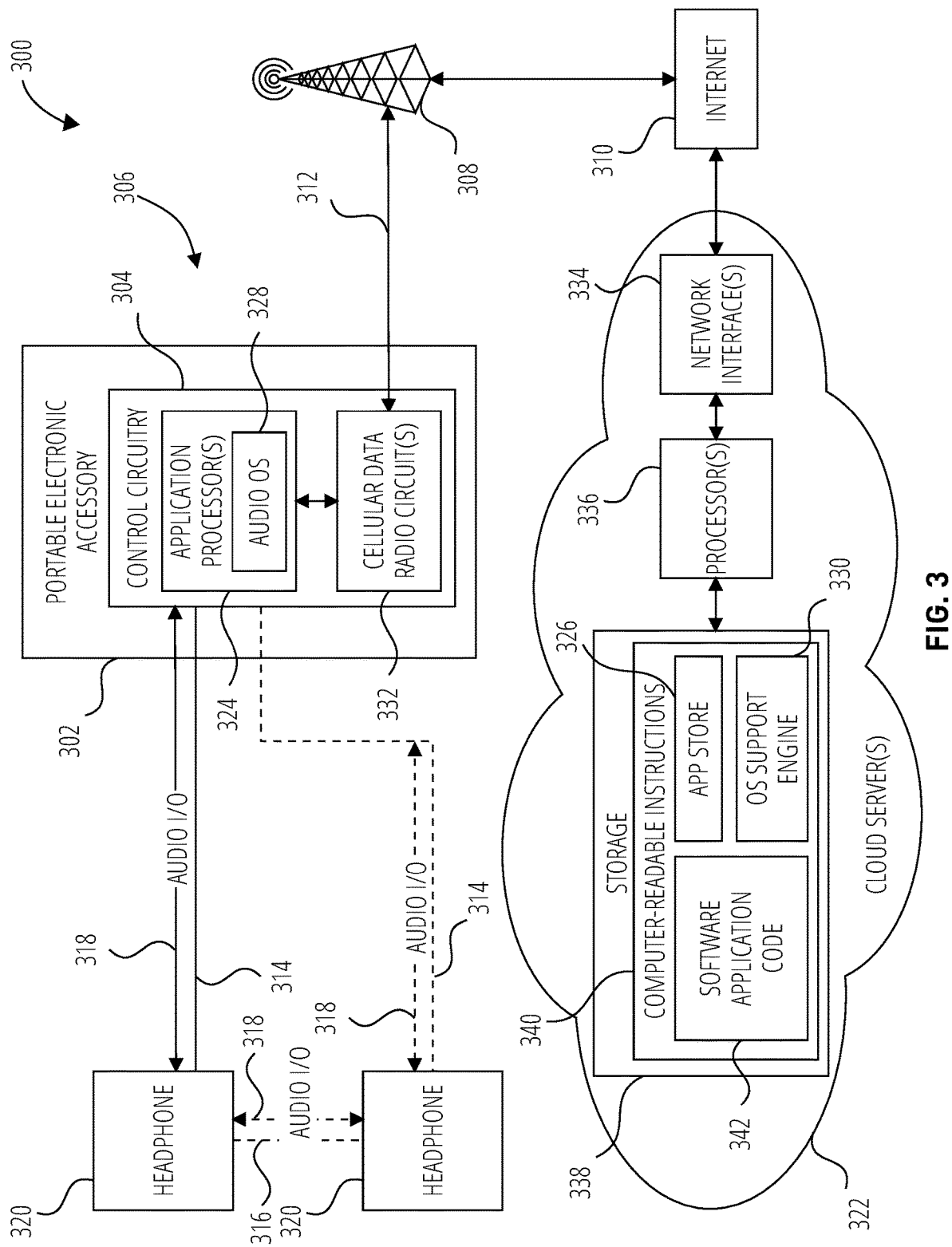
FIG. 3 is a block diagram of a cloud-assisted audio system, according to some embodiments.

FIG. 3 is a block diagram of a cloud-assisted audio system 300, according to some embodiments. The cloud-assisted audio system 300 includes a portable electronic accessory system 306, which may include, by way of non-limiting example, the portable electronic accessory system 100 of FIG. 1 or the portable electronic accessory system 200 of FIG. 2. The cloud-assisted audio system 300 also includes a cellular base station 308 and cloud servers 402, which are connected to the Internet 310.

The portable electronic accessory system 306 includes headphones 320 similar to the headphones 128 of FIG. 1 and FIG. 2. The portable electronic accessory system 306 also includes a portable electronic accessory 302 similar to the portable electronic accessory 102 of FIG. 1 and the portable electronic accessory 202 of FIG. 2. The portable electronic accessory 302 includes control circuitry 304, which may include a removable control package such as the removable control package 104 of FIG. 1 or built in control circuitry such as the control circuitry 204 of FIG. 2.

The control circuitry 304 is operably coupled to the headphones 320 (e.g., via one or more wireless PAN networks 314). Accordingly, the control circuitry 304 is operably coupled to speakers 150 and microphones 148 (FIG. 1 and FIG. 2) of the headphones 320. The microphones 148 of the headphone 320 are configured to receive audio inputs. The speakers 150 are configured to provide audio outputs. The wireless PAN network 314 may deliver the audio inputs and audio outputs (audio I/O 318) between the headphones 320 and the control circuitry 304.

The control circuitry 304 includes one or more application processors 324 and one or more cellular data radio circuits 332 operably coupled to the one or more application processors 324. The cellular data radio circuits 332 are configured to communicate with the cloud servers 322 through a cellular data network 312 (e.g., via the cellular base station 308 and the Internet 310). The cellular data radio circuits 332 are examples of the cellular data radio circuits 112 of FIG. 1 and FIG. 2. The cellular data radio circuits 332 may enable the control circuitry 304 to connect to the cellular base station 308 via a cellular data network 312, which is capable of enabling bidirectional communications between the control circuitry 304 (e.g., the application processors 324) and the cloud servers 322 via a cellular data network 312 and the cellular base station 308. By way of non-limiting examples, the cellular data network 312 may be provided according to 4G LTE protocols or 5G protocols.

The application processors 324 are configured to execute at least a portion of an audio operating system 328. The audio operating system 328 is configured to provide an audio interface that is screen-free. The audio interface may, however, be enhanced by headphone buttons of the headphone 320 (headphone buttons not shown) and/or haptic outputs (e.g., provided by a vibration motor of the headphones 320, also not shown). The audio interface may include audio inputs and audio outputs of audio I/O 318. By way of non-limiting examples, the audio outputs may include audio alerts (e.g., alarms, "beeps," verbal statements, or combinations thereof), verbally stated questions, verbally stated lists of menu options, other audio outputs, and combinations thereof. Also by way of non-limiting examples, the audio inputs may include spoken commands (e.g., spoken words and/or phrases linked to specific operations to be performed responsive to the spoken words and/or phrases), spoken questions, The audio operating system 328 is configured to host audio software applications provided by the cloud servers 322. The audio software applications are configured to operate free from graphical user interface elements based at least in part on the audio inputs and the audio outputs (e.g., the audio I/O 318). The audio software applications may also be configured to operate based on headphone buttons and haptic outputs. In some embodiments the audio operating system 328 is configured to enable and disable the audio software applications responsive to the audio inputs of the audio I/O 318. In some embodiments the audio operating system 328 is configured to provide audio notifications of new audio functional features that are available to be provided via the application processors 324. By way of non-limiting examples, the audio interface may be configured to provide the audio notifications periodically, responsive to availability of the new audio functional features, and/or responsive to the audio inputs.

The cloud servers 322 are configured to support the portable electronic accessory 302. The cloud servers 322 include one or more network interfaces 334 configured to communicate with the portable electronic accessory 302 (e.g., via the Internet 310, the cellular base station 308, and the cellular data network 312), one or more processors 336 operably coupled to the network interfaces 334, and one or more data storage devices 338 operably coupled to the one or more processors 336. In some embodiments operation of the audio operating system 328 may be distributed between the application processors 324 and the cloud servers 322 (e.g., the operating system support engine code 330). In some embodiments the application processors 324 are configured to execute at least a portion of the audio operating system 328 as a virtual machine to audio operating system code operated by the cloud servers 322.

The data storage devices 338 include computer-readable instructions 340 stored thereon. The computer-readable instructions 340 include software application code 342 for the audio software applications to be hosted by the audio operating system 328 of the portable electronic accessory 302.

The computer-readable instructions 340 also include operating system support engine code 330 that, when executed by the processors 336, is configured to support operation of the audio operating system 328. In some embodiments the operating system support engine code 330 is configured to instruct the processors 336 to support the operation of the audio operating system 328 by executing a cloud audio operating system. By way of non-limiting example, the operating system support engine code 330 may include a portion of the audio operating system 328 (e.g., a cloud audio operating system) and the application processors 324 may operate as a virtual machine.

In some embodiments the operating system support engine code 330 is configured to instruct the processors 336 to provide spatialized audio capabilities. Spatialized audio may be used to accurately present to the headphones 320 location cues and sounds within a three-dimensional audio space that humans understand. For example, sounds may be perceived as coming from ahead, behind, left, or right, from nearby or from far in the distance, and from a certain elevation relative to the hearer. Spatialized audio may be used for sightless navigation to locate a position of sounds within the user's audio space. For example, a navigation prompt to "turn left in 200 feet" may be presented to the user as coming from the intended direction, faintly at first, and then growing "closer" as the user closes on the point of the turn, at which point the prompt may indicate strongly to "turn left forty-five degrees now," without limitation. The prompt may be presented as positioned strongly on the left side of the audio space of the user. Geolocation and dead reckoning along with further audio prompts may be used to ensure the user is following navigation instructions.

Spatialized audio may also be used to enable an immersive and accurate health and workout experience by positioning environmental sounds accurately in the three-dimensional space perceived by the user. For example, audio of a virtual coach may be presented to be perceived as "walking around" a user during a coaching session and the coach's voice could be presented as coming from in front of or to the side of the user.

In some embodiments the operating system support engine code 330 is configured to instruct the processors 336 to provide voice printing and bio-credentials for security capabilities. Voice printing may be used as an augmented biosecurity feature to ensure user and device security. Voice printing may be combined with biometrics data to create an extremely secure bio-password that is truly hands-free. By way of non-limiting example, a user may insert a removable control package (e.g., the removable control package 104 of FIG. 1) into the portable electronic accessory 302, and be automatically validated through his or her bio-credentials.

The computer-readable instructions 340 further include audio software application store code 326. The audio software application store code 326 is configured to provide the audio software applications responsive to the audio I/O 318 at the portable electronic accessory 302. As previously discussed, the audio interface may be configured to provide audio notifications regarding new audio software applications and services periodically, responsive to availability of the new audio functional features, and/or responsive to the audio inputs. As a specific non-limiting example, the user may receive audio notifications of new audio software applications and/or services he or she may be interested in, and can verbally opt in to these audio software applications and services by speaking to the earphone, rather than interacting with a screen. The user may also verbally request "what's new" and receive audio prompts describing audio software applications and/or services and deemed interesting or relevant to the particular user.

In some embodiments the portable electronic accessory 302 may include a TWS headphone case and the headphones 320 may be TWS headphones. The control circuitry 304 is configured to connect to the headphones 320 via the wireless PAN network 314 (e.g., BLUETOOTH®) to enable communication of audio I/O 318 between the control circuitry 304 and the headphones 320. One of the wireless PAN network 314 lines shown in FIG. 3 is illustrated using broken lines because in some embodiments only one of the headphone 320 may communicate directly with the control circuitry 304. In such embodiments a wireless PAN network 316 between the headphones 320 may be used to route the audio I/O 318 between the control circuitry 304 and the other one of the headphones 320 that is not directly connected to the control circuitry 304 by the wireless PAN network 314. In some embodiments, however, both of the headphone 320 may be directly connected to the control circuitry 304 using the wireless PAN network 314.

In some embodiments the audio software applications include a community engagement on the go software application. Using a cloud server-based community voice platform, the portable electronic accessory system 306 may power a community "chatroom" experience on the go. A real-time cloud hosted chatroom may be initiated using a simple voice command (e.g., of the audio I/O 318). Firmware of the audio operating system 328 may engage service in the cloud (e.g., the cloud servers 322). Such community engagement on the go software applications may enable persons (e.g., coaches, leaders) that direct groups of people (e.g., teams) in disparate locations to chat in real-time while coordinating performance of group tasks (e.g., engagements, missions, adventures) on the go and leverage additional data and analytics in real time. Community engagement may be enabled using a hands-free, voice driven voice over internet protocol (VoIP) service resident on the application processors 324. In addition, community engagement on the go software applications may supports an "always on" mode whereby users may simply listen passively or engage at will simply by speaking naturally, similarly to "hanging out" in a physical space, but virtually.

In some embodiments the audio software applications include location intelligence software applications. Location intelligence software applications may, for example, enable cloud data collection and execution of stored plans for adventures (e.g., stored at the portable electronic accessory 302 and/or at the cloud servers 322). Location intelligence software applications may also enable tracking of a user of the portable electronic accessory 302 and feedback from the user, which may be automatic, human generated, or both. Location intelligence software applications may also enable leaders (e.g., team leaders) to choreograph movement in advance. By way of non-limiting examples, a choreographed movement may include a patrol over a mountain on a certain path or a mountain hike. As a specific, non-limiting example, a choreographed movement may be initiated by a team leader providing a voice command such as "patrol over the mountain on a certain path."

A geolocater (not shown) of the portable electronic accessory 302 (e.g., of the control circuitry 304, of the headphones 320, or both) may enable a defined group to track each other and route along a predefined path. Location data may be provided by a global positioning system (GPS) location, wireless networks (e.g., WiFi networks, BLUETOOTH® networks), augmented or deduced (dead) reckoning (e.g., when GPS is unavailable) or combinations thereof. Augmented or deduced reckoning may use integrated motion sensors units (IMUs) such as accelerometers, gyroscopes, a digital compass, other sensors, or combinations thereof. IMUs, or IMUs in combination with GPS tracking, may enable detection of velocity and direction, attitude, sudden stops, impacts, falls, or combinations thereof.

By way of non-limiting example, a location intelligence software application may enable provision of real-time data to the cloud servers 322, which may alert a leader and/or other user if a user has deviated from a predetermined route. Biometric sensor (e.g., as part of the portable electronic accessory 302 and/or the headphones 320) may enable activity tracking and prediction (e.g., is the user walking, running, riding, swimming, etc.). Biometric sensors may be configured to detect environmental temperature, body temperature, pulse oximetry, oxygen saturation, heart rate, environmental sounds, other relevant variables, or combinations thereof. Proximity detection and alerts may be enabled using a combination of GPS tracking, embedded radio frequency (RF) signaling (e.g., received signal strength indicators (RSSIs) related to BLUETOOTH® low energy (BLE) links emitted by the portable electronic accessory 302 and/or the headphones 320). Proximity detection may be combined with the user's current location, direction, speed, and attitude to determine proximity to other users and/or obstacles, predict possible collisions, and/or provide relevant alerts.

For location intelligence software applications, haptic devices (not shown) and headphone buttons (not shown) in the headphones 320 may enable users to "feel" or signal each other without talking. As specific, non-limiting examples, in instances where users are in the dark or operating in a dense landscape, a haptic device (e.g., a vibration motor) in a right (as opposed to left) headphone 320 may be driven to vibrate responsive to proximity of another user within ten meters to the right to signal the presence of the other user. Geolocation devices (not shown) of the portable electronic accessory 302 and/or the headphones 320 may enable alerts of dangers or obstacles in real time.

By way of non-limiting example, for bike riding applications, alerts may be provided when other riders come into proximity, and a lane assist feature indicating that a vehicle is approaching. Also by way of non-limiting example, a six feet proximity alert may be used during the spread of respiratory disease (e.g., COVID-19). As a further non-limiting example, a team leader may use a headphone button (e.g., a double tap of the headphone button) trigger a haptic signal in other users' headphones (e.g., the headphone 320) if for whatever reason the team leader cannot or does not desire to speak out loud (e.g., alert if there is enemy in the area, or "alert I see a Bear"). As another non-limiting example, a team leader and/or team members could also use a command (e.g., a verbal command) to create a community chatroom to connect all members on the go. In some embodiments, team members, as designated, may listen to other users' environmental sounds using the microphones on the other users' headphones (e.g., the headphones 320), which may be streamed as real-time audio data to the cloud. For example, the team leader may listen to the audio at a particular user's location for clues to current whereabouts or condition of the particular use, or to eavesdrop.

In some embodiments the audio software applications include health and workout intelligence software applications. Health and workout intelligence software applications may enable collection of physical exertion effort data and collection of biometrics data. Health and workout intelligence software applications may also enable analysis of collected data (e.g., physical exertion effort data, biometrics data), and provide downstream assistance. Biometrics data (e.g., heart rate, blood pressure, pulse-ox, etc.) may be collected through the headphones 320, which are connected to the user's ear. Biometrics data may be passed to the cloud servers 322 on the go for data collection. Also workout analytics may be collected in real-time and passed to the cloud servers 322 for physical and/or athletic evaluation. Automatic audio feedback may be sent to the user in real time through the headphones 320.

A geolocator of the portable electronic accessory 302 and/or the headphone 320 may enable tracking of user data, user location, and user speed. Data may be collected and stored in an ecosystem with an at-home workout system. With the above-discussed data passed to a coach, a doctor, and/or a leader in real-time via the cloud servers 322, consultation services and feedback may be provided to the user. Users may extend home workout experience from in-home trainers to an on the go experience with real-time coaching through cloud connected teachers. Voice commands from a user may query and leverage coaching and analytics support while on the go.

Figure 4:
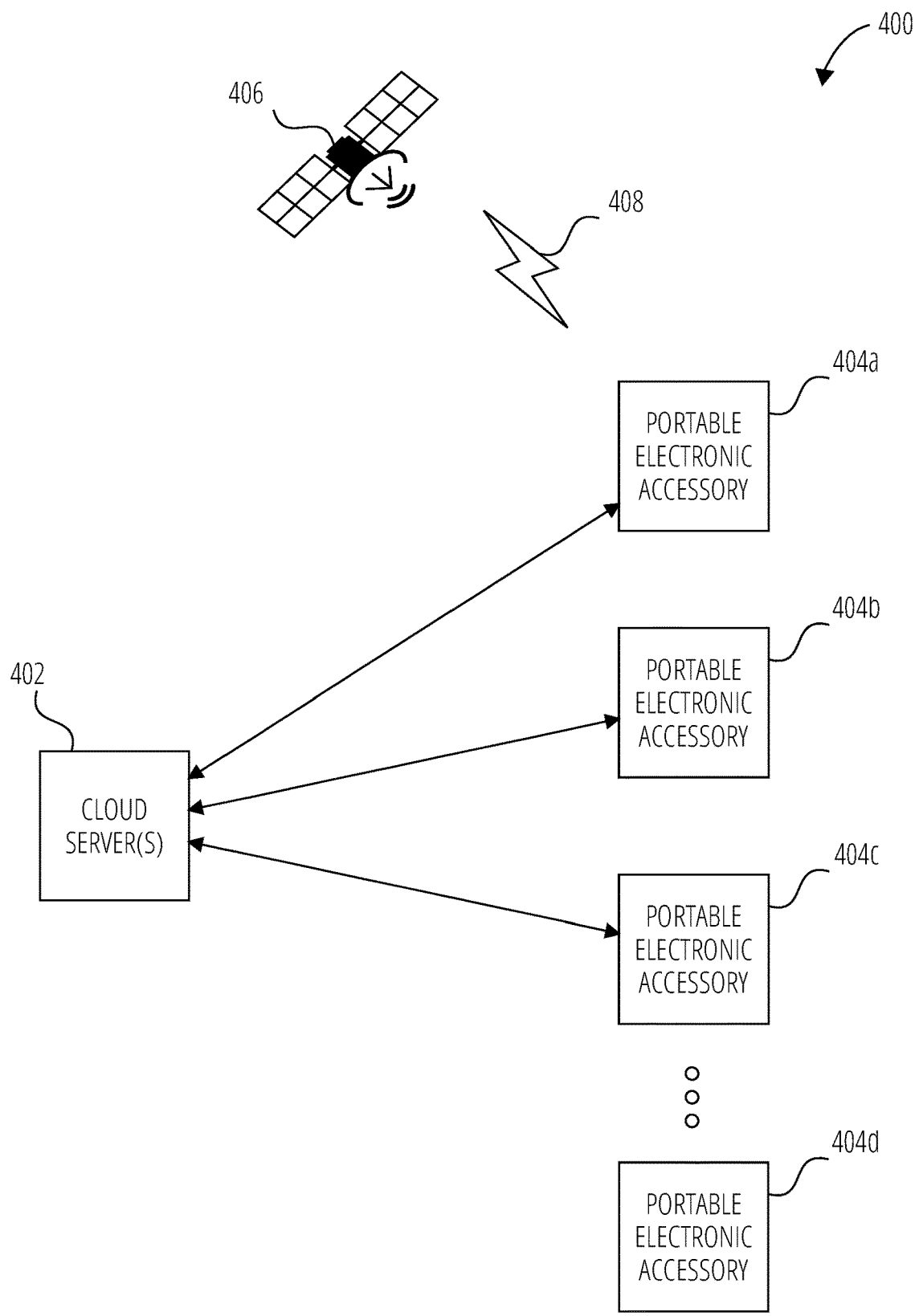
FIG. 4 is a block diagram of a cloud-assisted audio system, according to some embodiments.

FIG. 4 is a block diagram of a cloud-assisted audio system 400, according to some embodiments. The cloud-assisted audio system 400 includes one or more cloud servers 402 similar to the one or more cloud servers 322 of FIG. 3, and portable electronic accessories 404a-404d, each of which is similar to the portable electronic accessory 102 of FIG. 1, the portable electronic accessory 202 of FIG. 2, or the portable electronic accessory 302 of FIG. 3. The portable electronic accessories 404a-404d are configured to communication with the cloud servers 402 as discussed above for the portable electronic accessory 302 and the cloud servers 322 of FIG. 3 (e.g., via cellular data networks, cellular base stations, and the internet). The cloud-assisted audio system 400 also includes satellites 406 configured to provide geo-location signals 408 to enable geolocation and GPS functionality disclosed herein.

As discussed above, various audio software applications and/or other functions of the cloud-assisted audio system 300 of FIG. 3 may involve coordination of various users of portable electronic accessories such as the portable electronic accessories 404a-404d. FIG. 4 illustrates an example of a network architecture for a cloud-assisted audio system 400 that enables such cooperative functions.

Figure 5:
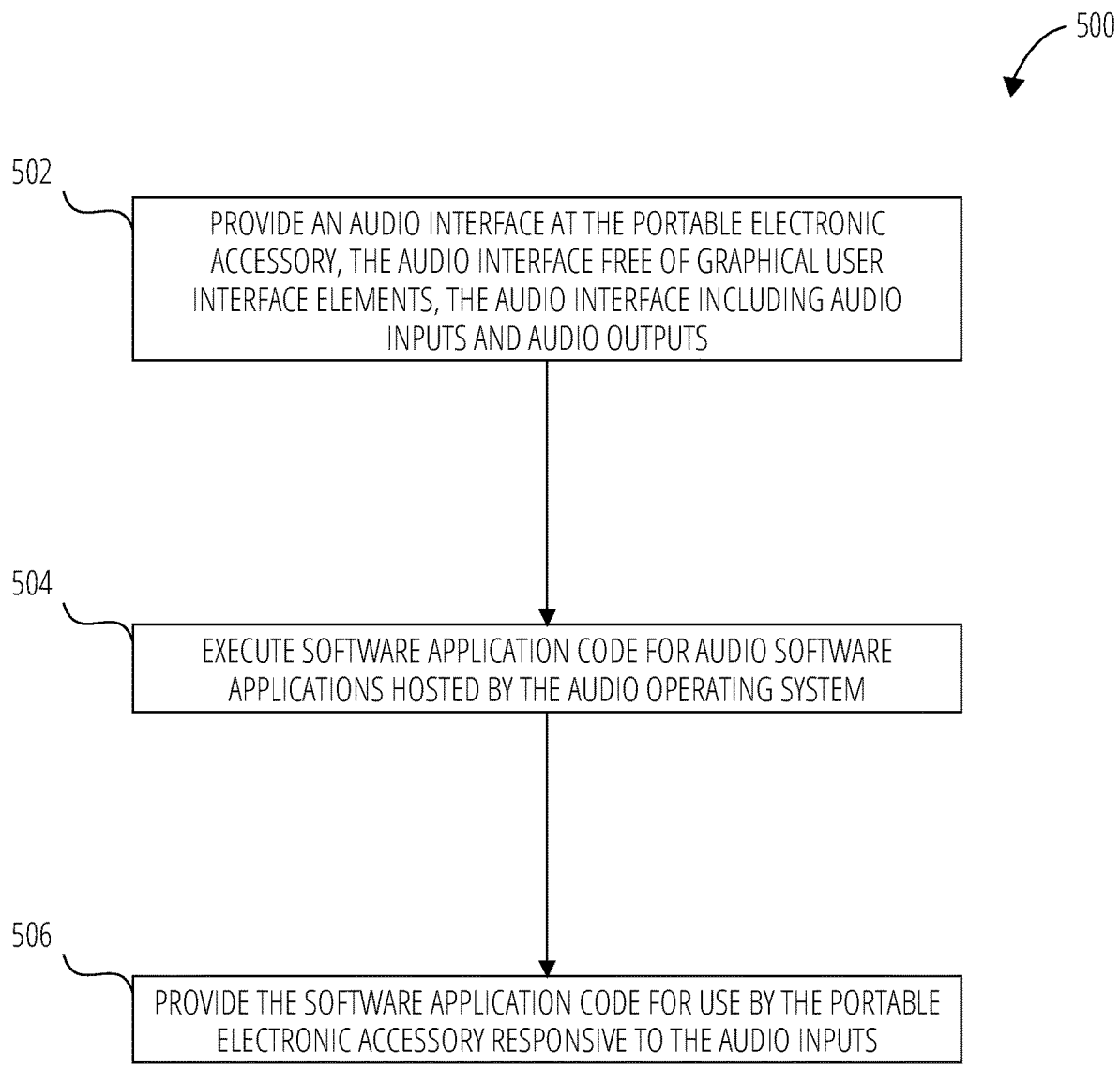
FIG. 5 is a flowchart illustrating a method of operating an audio operating system for a portable electronic accessory, according to some embodiments.

FIG. 5 is a flowchart illustrating a method 500 of operating an audio operating system (e.g., the audio operating system 328 of FIG. 3) for a portable electronic accessory (e.g., the portable electronic accessory 102 of FIG. 1, the portable electronic accessory 202 of FIG. 2, the portable electronic accessory 302 of FIG. 3), according to some embodiments. At operation 502 the method 500 includes providing an audio interface at the portable electronic accessory. The audio interface is free of graphical user interface elements, according to embodiments disclosed herein. The audio interface includes audio inputs and audio outputs (e.g., the audio I/O 318 of FIG. 3).

At operation 504 the method 500 includes executing software application code for audio software applications hosted by the audio operating system. In some embodiments executing the software application code includes executing the software application code by one or more cloud servers (e.g., the cloud servers 322 of FIG. 3, the cloud servers 402 of FIG. 4) remote from the portable electronic accessory. In some embodiments executing the software application code includes executing the software application code by one or more application processors (e.g., the application processors 116 of FIG. 1 and FIG. 2, the application processors 324 of FIG. 3) of the portable electronic accessory. In some embodiments executing the software application code includes coordinating activity of the portable electronic accessory with activities of one or more other portable electronic accessories.

At operation 506 the method 500 includes providing the software application code for use by the portable electronic accessory responsive to the audio inputs. In some embodiments providing the audio interface at the portable electronic accessory includes providing the audio outputs to one or more speakers (e.g., the speakers 150 of FIG. 1 and FIG. 2) of one or more headphones (e.g., the headphones 128 of FIG. 1 and FIG. 2, the headphones 320 of FIG. 3) of the portable electronic accessory. In some embodiments providing the audio interface at the portable electronic accessory includes receiving the audio inputs by one or more microphones (e.g., the microphones 148 of FIG. 1 and FIG. 2) of the one or more headphones of the portable electronic accessory.

Figure 6:
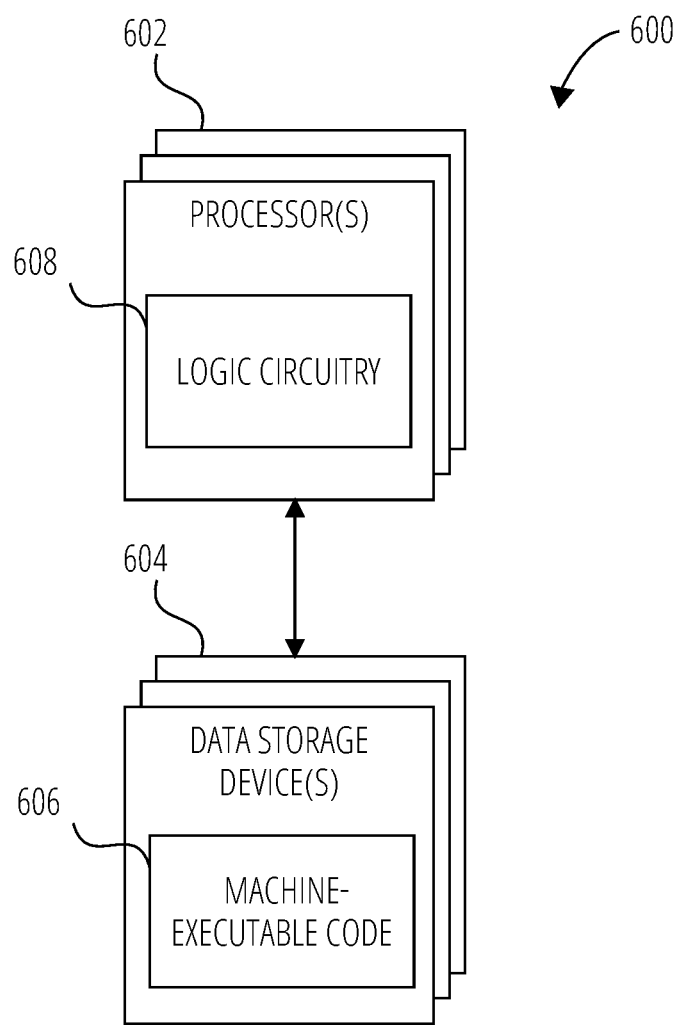
FIG. 6 is a block diagram of circuitry that, in some embodiments, may be used to implement various functions, operations, acts, processes, and/or methods disclosed herein.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 6 illustrates non-limiting examples of implementations of functional elements disclosed herein. In some embodiments, some or all portions of the functional elements disclosed herein may be performed by hardware specially configured for carrying out the functional elements.

FIG. 6 is a block diagram of circuitry 600 that, in some embodiments, may be used to implement various functions, operations, acts, processes, and/or methods disclosed herein. The circuitry 600 includes one or more processors 602 (sometimes referred to herein as "processors 602") operably coupled to one or more data storage devices (sometimes referred to herein as "storage 604"). The storage 604 includes machine-executable code 606 stored thereon and the processors 602 include logic circuitry 608. The machine-executable code 606 includes information describing functional elements that may be implemented by (e.g., performed by) the logic circuitry 608. The logic circuitry 608 is adapted to implement (e.g., perform) the functional elements described by the machine-executable code 606. The circuitry 600, when executing the functional elements described by the machine-executable code 606, should be considered as special purpose hardware configured for carrying out functional elements disclosed herein. In some embodiments the processors 602 may be configured to perform the functional elements described by the machine-executable code 606 sequentially, concurrently (e.g., on one or more different hardware platforms), or in one or more parallel process streams.

When implemented by logic circuitry 608 of the processors 602, the machine-executable code 606 is configured to adapt the processors 602 to perform operations of embodiments disclosed herein. For example, the machine-executable code 606 may be configured to adapt the processors 602 to perform at least a portion of the method 500 of FIG. 5. As another example, the machine-executable code 606 may be configured to adapt the processors 602 to perform at least a portion or a totality of the operations discussed for the application processors 116 of FIG. 1 and FIG. 2, the cellular data radio circuits 112 of FIG. 1 and FIG. 2, the PAN radio circuits 114 of FIG. 1 and FIG. 2, the PAN peripheral circuits 134 of FIG. 1 and FIG. 2, the power circuitry 118 of FIG. 1 and FIG. 2, the control circuitry 304 of FIG. 3, the application processors 324 of FIG. 3, the cellular data radio circuits 332 of FIG. 3, and/or the cloud servers 322 of FIG. 3.

The processors 602 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 606 (e.g., software code, firmware code, hardware descriptions) related to embodiments of the present disclosure. It is noted that a general-purpose processor (may also be referred to herein as a host processor or simply a host) may be a microprocessor, but in the alternative, the processors 602 may include any conventional processor, controller, microcontroller, or state machine. The processors 602 may also be implemented as a combination of computing devices, such as a combination of a DSP and a microprocessor, a plurality of microprocessors, one or more microprocessors in conjunction with a DSP core, or any other such configuration.

In some embodiments the storage 604 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 602 and the storage 604 may be implemented into a single device (e.g., a semiconductor device product, a system on chip (SOC), etc.). In some embodiments the processors 602 and the storage 604 may be implemented into separate devices.

In some embodiments the machine-executable code 606 may include computer-readable instructions (e.g., software code, firmware code). By way of non-limiting example, the computer-readable instructions may be stored by the storage 604, accessed directly by the processors 602, and executed by the processors 602 using at least the logic circuitry 608. Also by way of non-limiting example, the computer-readable instructions may be stored on the storage 604, transferred to a memory device (not shown) for execution, and executed by the processors 602 using at least the logic circuitry 608. Accordingly, in some embodiments the logic circuitry 608 includes electrically configurable logic circuitry 608.

In some embodiments the machine-executable code 606 may describe hardware (e.g., circuitry) to be implemented in the logic circuitry 608 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG®, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 608 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine-executable code 606 may include an HDL, an RTL, a GL description, a mask level description, other hardware description, or any combination thereof.

In embodiments where the machine-executable code 606 includes a hardware description (at any level of abstraction), a system (not shown, but including the storage 604) may be configured to implement the hardware description described by the machine-executable code 606. By way of non-limiting example, the processors 602 may include a programmable logic device (e.g., an FPGA or a PLC) and the logic circuitry 608 may be electrically controlled to implement circuitry corresponding to the hardware description into the logic circuitry 608. Also by way of non-limiting example, the logic circuitry 608 may include hard-wired logic manufactured by a manufacturing system (not shown, but including the storage 604) according to the hardware description of the machine-executable code 606.

Regardless of whether the machine-executable code 606 includes computer-readable instructions or a hardware description, the logic circuitry 608 is adapted to perform the functional elements described by the machine-executable code 606 when implementing the functional elements of the machine-executable code 606. It is noted that although a hardware description may not directly describe functional elements, a hardware description indirectly describes functional elements that the hardware elements described by the hardware description are capable of performing.

EXAMPLES

A non-exhaustive, non-limiting list of example embodiments follows. Not each of the example embodiments listed below is explicitly and individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1: A portable electronic accessory, comprising: one or more microphones configured to receive audio inputs; one or more speakers configured to provide audio outputs; and control circuitry operably coupled to the one or more speakers and the one or more microphones, the control circuitry including: one or more cellular data radio circuits configured to communicate with one or more cloud servers through a cellular data network; and one or more application processors configured to execute at least a portion of an audio operating system, the audio operating system configured to host audio software applications provided by the one or more cloud servers, the audio software applications configured to operate free from graphical user interface elements based at least in part on the audio inputs and the audio outputs.

Example 2: One or more cloud servers for supporting a portable electronic accessory, the one or more cloud servers comprising: a network interface configured to communicate with the portable electronic accessory; one or more processors operably coupled to the network interface; and one or more data storage devices operably coupled to the one or more processors, the one or more data storage devices including computer-readable instructions stored thereon, the computer-readable instructions including: software application code for audio software applications to be hosted by an audio operating system of the portable electronic accessory, the audio software applications configured to operate free from graphical user interface elements based at least in part on audio inputs and audio outputs at the portable electronic accessory; and operating system support engine code that, when executed by the one or more processors, is configured to support operation of the audio operating system.

Example 3: The portable electronic accessory of Example 1 and/or the one or more cloud servers of Example 2, wherein: the one or more cloud servers are configured to host a community voice platform; and the portable electronic accessory and one or more other portable electronic accessories are configured to enable users of the portable electronic accessory and the one or more other portable electronic accessories to participate in audio communications via the community voice platform.

Example 4: The portable electronic accessory and/or the one or more cloud servers of Example 2, wherein the audio communications comprise at least substantially real-time audio communications.

Example 5: The portable electronic accessory and/or the one or more cloud servers according to any one of Examples 3 and 4, wherein the one or more application processors are configured to execute a voice-driven, hands-free voice over internet (VoIP) platform for the community voice platform.

Example 6: The portable electronic accessory and/or the one or more cloud servers according to any one of Examples 3-5, wherein the community voice platform is configured to support an always on mode whereby the users of the portable electronic accessory and the one or more other portable electronic accessories are enabled to listen passively or engage at will by speaking.

Example 7: The portable electronic accessory of Example 1 and/or the one or more cloud servers of Example 2, wherein the portable electronic accessory includes a location device configured to provide location data to the one or more application processors.

Example 8: The portable electronic accessory and/or the one or more cloud servers of Example 7, wherein: the location device includes a geolocator configured to receive geolocation signals; and the location data includes geolocation data provided by the geolocator responsive to the geolocation signals.

Example 9: The portable electronic accessory and/or the one or more cloud servers according to any one of Examples 7 and 8, wherein the location data includes local area network and/or personal area network augmented location data.

Example 10: The portable electronic accessory and/or the one or more cloud servers according to any one of Examples 7-9, wherein: the location device includes one or more of an accelerometer, a gyroscope, and a digital compass; and the location data includes one or more of velocity data, direction data, attitude data, and accelerometer data.

Example 11: The portable electronic accessory and/or the one or more cloud servers according to any one of Examples 7-10, wherein the portable electronic accessory, one or more other portable electronic accessories, and the one or more servers are configured to enable users of the portable electronic accessory and the one or more other portable electronic accessories to participate in audio communications.

Example 12: The portable electronic accessory and/or the one or more cloud servers of Example 11, wherein responsive to a verbal command received by one of the portable electronic accessory and the one or more other portable electronic accessories, the one or more servers are configured to initiate a choreographed movement function to coordinate movement of the users according to a predetermined path.

Example 13: The portable electronic accessory and/or the one or more cloud servers according to any one of Examples 11 and 12, wherein the one or more servers are configured to trigger the portable electronic accessory to provide an alert responsive to a detected proximity of one of the one or more other portable electronic accessories.

Example 14: The portable electronic accessory and/or the one or more cloud servers of Example 13, wherein the alert is portrayed so as to be perceived as originating from a direction in which the one of the one or more other portable electronic accessories is positioned relative to the portable electronic accessory.

Example 15: The portable electronic accessory and/or the one or more cloud servers according to any one of Examples 11-14, wherein portable electronic accessory, the one or more other portable electronic accessories, and the one or more cloud servers are configured to enable the users to hear audio detected in proximity to others of the users.

Example 16: The portable electronic accessory and/or the one or more cloud servers according to any one of Examples 7-15, wherein the portable electronic accessory further includes one or more biometric sensors configured to provide, to the one or more application processors, biometric data collected from a user of the portable electronic accessory.

Example 17: The portable electronic accessory of Example 1 and/or the one or more cloud servers of Example 2, wherein the portable electronic accessory further includes one or more biometric sensors configured to provide, to the one or more application processors, biometric data collected from a user of the portable electronic accessory.

Example 18: The portable electronic accessory and/or the one or more cloud servers of Example 17, wherein the one or more biometric sensors include one or more of a heart rate sensor, a blood pressure sensor, and a pulse oximeter.

Example 19: The portable electronic accessory and/or the one or more cloud servers according to any one of Examples 17 and 18, wherein the portable electronic accessory includes one or more headphones including the one or more biometric sensors.

Example 20: The portable electronic accessory and/or the one or more cloud servers according to any one of Examples 17-19, wherein the portable electronic accessory includes a location device configured to provide location information to the one or more application processors.

Example 21: The portable electronic accessory and/or the one or more cloud servers according to any one of Examples 17-20, wherein the portable electronic accessory and the one or more cloud servers are configured to provide data collection of the biometrics data for one or more of workout, health, and medical purposes.

Example 22: The portable electronic accessory and/or the one or more cloud servers according to any one of Examples 17-21, wherein the portable electronic accessory and the one or more cloud servers are configured to provide analysis for the biometrics data for one or more of workout, health, and medical purposes.

Example 23: The portable electronic accessory and/or the one or more cloud servers according to any one of Examples 17-22, wherein the portable electronic accessory and the one or more cloud servers are configured to provide one of a home and on the go audio workout trainer function.

Example 24: The portable electronic accessory of Example 1 and/or the one or more cloud servers of Example 2, wherein the portable electronic accessory is configured to deliver spatialized audio to a user of the portable electronic accessory to present audio to be perceived, by the user, as originating from a predetermined point in a three-dimensional space relative to the user.

Example 25: The portable electronic accessory and/or the one or more cloud servers of Example 24, wherein the portable electronic accessory and the one or more cloud servers are configured to provide sightless audio navigation instructions to a user of the portable electronic accessory.

Example 26: The portable electronic accessory and/or the one or more cloud servers of Example 25, wherein the sightless audio navigation instructions are presented to the user to be perceived as originating from a location toward which the sightless audio navigation instructions are directing the user.

Example 27: The portable electronic accessory of Example 1, wherein the portable electronic accessory is configured to use one of voice printing or bio-credentials for security.

Example 28: The portable electronic accessory of Example 27, wherein the portable electronic accessory is configured to use a combination of voice printing and bio-credentials for security.

CONCLUSION

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A portable electronic accessory, comprising:
   one or more microphones configured to receive audio inputs;
   one or more speakers configured to provide audio outputs; and
   control circuitry operably coupled to the one or more speakers and the one or more microphones, the control circuitry implemented as a removable control package that is removable from the portable electronic accessory, the control circuitry including:
      one or more cellular data radio circuits configured to communicate with one or more cloud servers through a cellular data network; and
      one or more application processors configured to execute at least a portion of an audio operating system, the audio operating system configured to host audio software applications provided by the one or more cloud servers, the audio software applications configured to operate free from graphical user interface elements based at least in part on the audio inputs and the audio outputs.

2. The portable electronic accessory of claim 1, wherein the audio operating system is configured to enable and disable the audio software applications responsive to the audio inputs.

3. The portable electronic accessory of claim 1, wherein the audio operating system is configured to provide an audio interface that is screen-free.

4. The portable electronic accessory of claim 3, wherein the audio interface is configured to provide audio notifications of new audio functional features that are available to be provided via the one or more application processors.

5. The portable electronic accessory of claim 4, wherein the audio interface is configured to provide the audio notifications periodically.

6. The portable electronic accessory of claim 4, wherein the audio interface is configured to provide the audio notifications responsive to availability of the new audio functional features.

7. The portable electronic accessory of claim 4, wherein the audio interface is configured to provide the audio notifications responsive to the audio inputs.

8. The portable electronic accessory of claim 3, wherein operation of the audio operating system is distributed between the one or more application processors and the one or more cloud servers.

9. The portable electronic accessory of claim 3, wherein the one or more application processors are configured to execute the at least the portion of the audio operating system as a virtual machine to audio operating system code operated by the one or more cloud servers.

10. The portable electronic accessory of claim 1, wherein the portable electronic accessory includes one or more headphones including the one or more speakers and the one or more microphones.

11. The portable electronic accessory of claim 10, wherein:
   the one or more headphones include truly wireless stereo (TWS) headphones; and
   the portable electronic accessory includes a TWS headphone charging case including the control circuitry.

12. The portable electronic accessory of claim 11, wherein the removable control package is removable from the TWS headphone charging case.

13. One or more cloud servers for supporting a portable electronic accessory, the one or more cloud servers comprising:
   a network interface configured to communicate with the portable electronic accessory;
   one or more processors operably coupled to the network interface; and
   one or more data storage devices operably coupled to the one or more processors, the one or more data storage devices including computer-readable instructions stored thereon, the computer-readable instructions including:
      software application code for audio software applications to be hosted by an audio operating system of the portable electronic accessory, the audio software applications configured to operate free from graphical user interface elements based at least in part on audio inputs and audio outputs at the portable electronic accessory; and
      operating system support engine code that, when executed by the one or more processors, is configured to execute at least a portion of the audio operating system of the portable electronic accessory via a virtual machine emulating the portable electronic accessory, the audio operating system free of graphical user interface elements.

14. The one or more cloud servers of claim 13, wherein the operating system support engine code is configured to instruct the one or more processors to support operation of the audio operating system by executing a cloud audio operating system.

15. The one or more cloud servers of claim 13, wherein the computer-readable instructions further include an audio software application store configured to provide the audio software applications responsive to the audio inputs and the audio outputs at the portable electronic accessory.

16. A method of operating an audio operating system for a portable electronic accessory, the method comprising:
   providing, by control circuitry of a truly wireless stereo (TWS) headphone charging case and TWS headphones of the portable electronic accessory, an audio interface of the audio operating system, the audio operating system free of graphical user interface elements, the audio interface including audio inputs and audio outputs, the control circuitry of the TWS headphone charging case including one or more cellular data radio circuits and one or more application processors;

executing software application code for audio software applications hosted by the audio operating system; and providing the software application code for use by the portable electronic accessory responsive to the audio inputs.

17. The method of claim 16, wherein executing the software application code comprises executing the software application code by one or more cloud servers remote from the portable electronic accessory.

18. The method of claim 16, wherein executing the software application code comprises executing the software application code by the one or more application processors of the portable electronic accessory.

19. The method of claim 16, wherein providing the audio interface at the portable electronic accessory comprises:

providing the audio outputs to one or more speakers of one or more headphones of the portable electronic accessory; and receiving the audio inputs by one or more microphones of the one or more headphones of the portable electronic accessory.

20. The method of claim 16, wherein executing the software application code comprises coordinating activity of the portable electronic accessory with activities of one or more other portable electronic accessories.

* * * * *